(12) United States Patent
Walker et al.

(10) Patent No.: US 6,876,978 B1
(45) Date of Patent: *Apr. 5, 2005

(54) METHOD AND APPARATUS FOR GENERATING A COUPON

(75) Inventors: Jay S. Walker, Ridgefield, CT (US); Andrew S. Van Luchene, Norwalk, CT (US); Dean Alderucci, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 567 days.

This patent is subject to a terminal disclaimer.

(21) Appl. No.: 09/643,668

(22) Filed: Aug. 18, 2000

Related U.S. Application Data

(63) Continuation of application No. 09/076,409, filed on May 12, 1998, which is a continuation-in-part of application No. 08/920,116, filed on Aug. 26, 1997, now Pat. No. 6,119,099, which is a continuation-in-part of application No. 08/822,709, filed on Mar. 21, 1997.

(51) Int. Cl.$^7$ .............................................. G06F 17/60

(52) U.S. Cl. ........................................ 705/26; 705/14

(58) Field of Search ..................................... 705/14, 26

(56) References Cited

U.S. PATENT DOCUMENTS

| | | | |
|---|---|---|---|
| 3,573,747 A | 4/1971 | Adams et al. ........... 340/172.5 |
| 4,108,361 A | 8/1978 | Krause ........................ 235/375 |
| 4,323,770 A | 4/1982 | Dieulot et al. .............. 235/375 |
| 4,441,160 A | * 4/1984 | Azcua et al. .................. 705/25 |
| 4,494,197 A | 1/1985 | Troy et al. ................... 364/412 |
| 4,500,880 A | 2/1985 | Gomersall et al. ..... 340/825.35 |
| 4,669,730 A | 6/1987 | Small ..................... 273/138 A |
| 4,677,553 A | 6/1987 | Roberts et al. ............. 364/412 |
| 4,689,742 A | 8/1987 | Troy et al. .................. 364/412 |
| 4,723,212 A | 2/1988 | Mindrum et al. ........... 364/401 |
| 4,760,247 A | 7/1988 | Keane et al. ................ 235/454 |
| 4,815,741 A | 3/1989 | Small ..................... 273/138 A |

(Continued)

FOREIGN PATENT DOCUMENTS

| | | |
|---|---|---|
| EP | 512413 A2 | 11/1992 |
| JP | 5242363 A | 9/1993 |
| WO | WO 9735441 A2 | 9/1997 |
| WO | WO 97/46961 | 12/1997 |
| WO | WO 97/50064 | 12/1997 |

OTHER PUBLICATIONS

"Cape Town", Nov. 8, 1979, Reuters.

"Save The Mark", Feb. 1, 1983, Financial Times (London), Section I; Men & Matters, at p. 12.

Cook Louise, "Consumer Watch: Clip, Snip, Save", Mar. 12, 1984, The Associated Press, Business News Section.

Greene, Jan, "Farm Bills Please Assns; National Grocers Association", Dec. 23, 1985, vol. 35, ISSN: 0039–5803 at p. 6.

(Continued)

Primary Examiner—James W. Myhre
(74) Attorney, Agent, or Firm—Michael D. Downs; Dean P. Alderucci

(57) ABSTRACT

A POS terminal generates a purchase price of a purchase, and generates a rounded price. The rounded price may be, for example, the lowest whole number greater than the purchase price. The POS terminal then calculates a round-up amount (change due the customer) as the difference between the purchase price and the rounded price. The coupon value is set based on the round-up amount. For example, the coupon may be redeemable for triple the amount of change due. The POS terminal prints on the coupon an identifier, such as a bar code, that is based on the coupon value. The bar code allows the coupon to be read by a POS terminal when the coupon is redeemed.

12 Claims, 19 Drawing Sheets

U.S. PATENT DOCUMENTS

| | | | |
|---|---|---|---|
| 4,825,045 A | 4/1989 | Humble | 235/383 |
| 4,839,507 A | 6/1989 | May | 235/381 |
| 4,854,590 A | 8/1989 | Jolliff et al. | 273/138 A |
| 4,859,838 A | 8/1989 | Okiharu | 235/383 |
| 4,882,473 A | 11/1989 | Bergeron et al. | 235/380 |
| 4,908,761 A | 3/1990 | Tai | 364/401 |
| 4,910,672 A | 3/1990 | Off et al. | 364/405 |
| 4,922,522 A | 5/1990 | Scanlon | 379/95 |
| 4,937,853 A | 6/1990 | Brule et al. | 379/96 |
| 4,982,337 A | 1/1991 | Burr et al. | 364/479 |
| 4,993,714 A | 2/1991 | Golightly | 273/138 A |
| 5,056,019 A | 10/1991 | Schultz et al. | 364/405 |
| 5,119,295 A | 6/1992 | Kapur | 364/412 |
| 5,128,862 A | 7/1992 | Mueller | 364/412 |
| 5,132,914 A | 7/1992 | Cahlander et al. | 364/478 |
| 5,172,328 A | 12/1992 | Cahlander et al. | 364/478 |
| 5,173,851 A | 12/1992 | Off et al. | 364/401 |
| 5,177,342 A | 1/1993 | Adams | 235/379 |
| 5,192,854 A | 3/1993 | Counts | 235/375 |
| 5,193,056 A | 3/1993 | Boes | 364/408 |
| 5,201,010 A | 4/1993 | Deaton et al. | 382/7 |
| 5,216,595 A | 6/1993 | Protheroe | 364/412 |
| 5,223,698 A | 6/1993 | Kapur | 235/375 |
| 5,231,569 A | 7/1993 | Myatt et al. | 364/408 |
| 5,239,165 A | 8/1993 | Novak | 235/375 |
| 5,243,515 A | 9/1993 | Lee | 364/401 |
| 5,245,533 A | 9/1993 | Marshall | 364/401 |
| 5,262,941 A | 11/1993 | Saladin et al. | 364/408 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | 364/405 |
| 5,297,031 A | 3/1994 | Gutterman et al. | 364/408 |
| 5,302,811 A | 4/1994 | Fukatsu | 235/381 |
| 5,309,355 A | 5/1994 | Lockwood | 364/401 |
| 5,353,218 A | 10/1994 | De Lapa et al. | 364/401 |
| 5,353,219 A * | 10/1994 | Mueller et al. | 705/16 |
| 5,380,991 A | 1/1995 | Valencia et al. | 235/383 |
| RE34,915 E | 4/1995 | Nichtberger et al. | 364/401 |
| 5,420,606 A | 5/1995 | Begum et al. | 345/156 |
| 5,459,306 A | 10/1995 | Stein et al. | 235/383 |
| 5,481,094 A | 1/1996 | Suda | 235/383 |
| 5,504,475 A | 4/1996 | Houdou et al. | 340/825.35 |
| 5,510,979 A | 4/1996 | Moderi et al. | 364/405 |
| 5,572,653 A | 11/1996 | DeTemple et al. | 395/501 |
| 5,581,064 A | 12/1996 | Riley et al. | 235/383 |
| 5,592,375 A | 1/1997 | Salmon et al. | 395/207 |
| 5,592,376 A | 1/1997 | Hodroff | 395/214 |
| 5,602,377 A | 2/1997 | Beller et al. | 235/462 |
| 5,611,052 A | 3/1997 | Dykstra et al. | 395/238 |
| 5,612,868 A | 3/1997 | Off et al. | 364/214 |
| 5,615,269 A | 3/1997 | Micali | 380/49 |
| 5,620,079 A | 4/1997 | Molbak | 194/217 |
| 5,621,201 A | 4/1997 | Langhams et al. | 235/380 |
| 5,621,640 A * | 4/1997 | Burke | 705/14 |
| 5,632,010 A | 5/1997 | Briechle et al. | 345/1 |
| 5,649,114 A | 7/1997 | Deaton et al. | 395/214 |
| 5,664,115 A | 9/1997 | Fraser | 705/37 |
| 5,665,953 A | 9/1997 | Mazzamuto et al. | 235/383 |
| 5,724,886 A | 3/1998 | Ewald et al. | 99/374 |
| 5,822,735 A | 10/1998 | De Lapa et al. | 705/14 |
| 5,832,457 A * | 11/1998 | O'Brien et al. | 705/14 |
| 5,857,175 A * | 1/1999 | Day et al. | 705/14 |
| 5,974,399 A | 10/1999 | Giuliani et al. | 705/14 |
| 6,024,288 A * | 2/2000 | Gottlich et al. | 235/493 |
| 6,112,191 A * | 8/2000 | Burke | 705/41 |
| 6,292,786 B1 * | 9/2001 | Deaton et al. | 705/14 |
| 6,307,958 B1 * | 10/2001 | Deaton et al. | 382/139 |
| 6,321,210 B1 * | 11/2001 | O'Brien et al. | 705/14 |

OTHER PUBLICATIONS

"POS Spectrum: A Lottery Looks to POS for Growth", Jan. 1989, POS News, vol. 5, No. 7, Coden: Bhorad, ISSN; 0896–6230 at p. 8.

Kuttner, Robert, "Computers May Turn the World Into One Big Commodities Pit", Sep. 11, 1989, Business Week, Economic Viewpoint Section, No. 3123 at p. 17.

Schrage, Michael, "An Experiment in Economic Theory; Labs Testing Real Markets", Nov. 26, 1989, The Record, Business Section at p. B01.

Schwall, Benjamin, "Let's Play the Cash Register Receipts Lottery", Dec. 25, 1990, The New York Times, Section 1, Column 4, Editorial Desk at p. 30.

Del Russo, Laura, "Marketel Says it Plans to Luanch Air Fare 'Auction' in June; Marketel International Inc.", Apr. 29, 1991, Travel Weekly, vol. 50, No. 34, ISSN: 0041–2082 at p. 1.

"Philips Offers Customers FInancing Through Citicorp; Philips Medical Systems North America, Citicorp North America, Inc.", Jun. 1991, Health Industry Today, vol. 54, No. 6, ISSN: 0745–4678 at p. 4.

Pelline, Jeff, "Travelers Bidding on Airline Tickets; SF Firm Offers Change for Cut–Rate Fares", Aug. 19, 1991, The San Francisco Chronicle, News Section at p. A4.

Del Russo, Laura, "Ticket–Bidding Firm Closes its Doors; Marketel International; Brief Article", Mar. 12, 1992, Travel Weekly, vol. 51, No. 21, ISSN: 0041–2082 at p. 1.

"Coupons Get Serious; Supermarkets Use Barcodes to Prevent Misredemptions", Oct. 1992, Information Access Company, vol. 68, No. 10, ISSN: 0193–1199 at p. 68.

"Winn–Dixie/The Salvation Army Report Contributions for War Against Hunger", Jun. 10, 1993, PR Newswire, Financial News Section.

Jones, Jeanne, "Data Readers Streamline Management; Scanner Technology Aids Retailers as Well as Plants, Wholesalers", Jun. 26, 1994, The Houston Post, Business at p. D1.

Fiorini, Phillip, "No Place for Penny?/ Smallest Coin Doesn÷t Make Cents to Some", Jul. 29, 1994, USA Today, News Section at p. 1A.

Smith, Alison, "Survey of UK Consumer Credit and Asset Finance", Nov. 3, 1994, Financial Times at p. VI.

Andreoli, Tom: Borden, Jeff; Healy, Beth; Strahler, Steven R.: and Veverka, Mark, "Cash Machine Offer a Whole Lotto Money for Withdrawal; An Unfortunate Juxta Position . . . ", Jun. 19, 1995, Crain's Chicago Business, News Section at p. 8.

"Spain: BBV Launches New Card", Jun. 22, 1995, Cards International at p. 5.

Knippenberg, Jim, "PSST! Will Local Radio Empires Strike Back?", Jul. 23, 1995, The Cincinnati Enquirer, Tempo Section at p. F01.

Hadley, Kimberly, "Pastors Praying Anti–Arson Effort Will Burn Bias", Jul. 26, 1996, The Nashville Banner, News Section at p. A13.

Gapper, John, "Natwest Reports Rise in Bad Debt", Jul. 31, 1996, Financial Times, New Section, UK at p. 09.

"Lynx Technology: Lynx to Provide Business Leasing Programme Through Schroder Leasing", Aug. 9, 1996, M2 Communications.

"Towards a Dream Market", Sep. 4, 1996, Financial Times (London), Section: Survey—FT IT at p. 03.

"Cyber Bid", Net Fund Ltd., 1996.

Bonnici, Joseph; Campbell, David; Fredenberger, William B.; and Hunnicutt, Kathryn H., "Consumer Issues in Coupon Usage: An Exploratory Analysis", Winter 1996/1997, Journal of Applied Business Research, vol. 13, No. 1, ISSN: 0892–7626, Coden: JPBEBK at p. 31–40.

Rehayem, Gilbert, "Opinion: X–Press Betting", La Fleur's Lottery World, Feb. 7, 1997 at p. 4.

Singletary, Michelle, "Electronic World Unchecked Problem? U.S. Move to Paperless Payments Raises Worries About Those Who Don't Use Banks", Mar. 4, 1997, The Washington Post, Financial Section at p. C01.

Kelsey, John and Schneier, Bruce, "Conditional Purchase Orders", Fourth ACM Conference on Computer Communication Security, Apr. 1997, ACM Press at p. 117–124.

"AVCO Financial Services", National Home Furnishing Association, (http://www.homefurnish.com/nhfa/avco.htm), Download Date May 23, 1997.

"Catalina Marketing Corporation; Products and Services", (http://www.catalinamktg.com/prodcdir.htm), Download Date May 29, 1997.

Riordan, Teresa, "Funneling Change to Useful Pursuits", Jun. 9, 1997, The New York Times at p. D2.

Nairn, Geoff, "The Key to Your Identity: Falling Costs will Allow Fingerprint Verification to be Widely Used", Jul. 15, 1997, Financial Times (London), Technology Section at p. 12.

"How The Exchange Works: The United Computer Exchange; How it all Works", (http://www.uce.com/howitworks.html), Download Date Jul. 23, 1997.

"Classified 2000 Free Nationwide Automotive . . .; About Us; Classifieds2000: The Internet Classifieds", (http://www.classifieds2000.com/cgi-cls/display/exe?C2K+aboutus), Download Date Aug. 6, 1997.

"Tradingfloor.com; General Trading Information and Terms Provided by Tradingfloor.com", (http://www.tradingfloor.com/info.htm), Download Date Aug. 14, 1997.

"NASDAQ", (http://www.home.axford.com/corfin/corfl1.htm), Download Date Aug. 15, 1997.

Prochaska–Cue, Kathy, "Acquiring Credit", (http://ianrwww.unl.edu/ianr/pubs/nebfacts/nf91–2.htm), Download Date Sep. 3, 1997.

"IAO—Onsale—GSCI—Zaution—Cyberswap—Auction World; About IAO", (http://www.:aoauction.com/about.htm), Download Date Sep. 8, 1997.

"Welcome to Onsale; Onsale Auctin Supersite", (http://www.onsale.com), Download Date Sep. 8, 1997.

Kirk, Jim, "Digital Promotions Make Quick Point; McDonald's Testing New Technology on Its Menus", Dec. 26, 1997, Chicago Tribune at p. 1–2.

"Progressive Introduces Kitchen Display System (KDS) for Restaurants", Jan. 23, 1998, PR Newswire, Financial News Section.

Adam, Blair, "JICC Coupon Guide Recommends Upgrades at Front End", Feb. 9, 1998, Supermarket News, ISSN: 0039–5803 at p. 23.

Livingston, Kimball, "In–Store Systems; Videocart Redux", Mar. 1998, RT Magazine, at p. 29–30, (http://retailtech.com).

"Advanced Mechanics Internet Specials", (http://www-.metroplexweb.com/advcpn2.htm), Download Date Mar. 12, 1998.

"U.P.C. Coupon Code Guidelines Manual; Uniform Code Council, Inc.", (http://www.uc–council.org/d31–3.htm), Download Date Mar. 12, 1998.

"New Wave Marketing", Apr. 1998, Times, Promotion, an SCA Quarterly Newsletter—First Quarter.

Hamstra, Mark, "Made for you Maneuvers Signal competitive Shift in QSR Category", Apr. 13, 1998, Nation's Restaurante News, Segment Study.

Fogarty, Rich, "Positive Input; The McDonald's POS–3 System Newsletter from Olivetti Solutions/OLSY", Spring/Summer 1998.

"H & K Dallas Inc.; McDonald's Universal Holding Cabinet Rollout Program", Winter 1998.

"NCR 7453 PC–Based Point–of–Sale Solutions", Winter 1998, NCR Corporation.

"For The Crew & The Customer; The Best Drive–Thru & Grill Service", Winter 1998, Olivetti.

"From Our Family to Yours . . ; 5 Weeks of Coupon Values for a Valuable Customer!", 1998, Wakefern Food Corporation.

"Its in the Bag; Introducting the Universal Holding Cabinet from Welbilt", Frymaster Holding Bin, Undated.

"Siren Technologies; Introducing the Digital Menu Board", Undated.

Myhre, James W., "Examiner's Affidavit", dated Feb. 22, 2001.

* cited by examiner

| RANGE OF PURCHASE PRICES 130 | ROUNDING MULTIPLE 132 |
|---|---|
| $0.00 - $7.49 | $1.00 |
| $7.50 - $9.99 | $5.00 |
| $10.00 - $12.49 | $1.00 |
| $12.50 AND GREATER | $5.00 |

FIG. 5

| ITEM 142 | ROUNDING MULTIPLE IF INCLUDED 144 | ROUNDING MULTIPLE IF NOT INCLUDED 146 |
|---|---|---|
| SWORDFISH STEAK | $10.00 | $1.00 |

FIG. 6

| CUSTOMER IDENTIFIER 208 | NUMBER OF PURCHASES 210 | NUMBER OF COUPONS REDEEMED 212 | AVERAGE NUMBER OF COUPONS REDEEMED PER PURCHASE 214 |
|---|---|---|---|
| 1234567 | 7 | 2 | 0.29 |
| 1234568 | 10 | 0 | 0 |
| 1234569 | 11 | 4 | 0.36 |
| 1234570 | 2 | 1 | 0.50 |

FIG. 8

| CUSTOMER IDENTIFIER 238 | NUMBER OF PURCHASES 240 | NUMBER OF ACCEPTED UPSELL OFFERS 242 | ACCEPTANCE RATE 244 |
|---|---|---|---|
| 1234567 | 7 | 3 | 0.43 |
| 1234568 | 10 | 1 | 0.10 |
| 1234569 | 11 | 8 | 0.73 |

FIG. 9

| COUPON IDENTIFIER 396 | COUPON VALUE 398 | VALIDITY PERIOD 400 | REQUIRED ITEM 402 |
|---|---|---|---|
| 105789230 | $1.00 OFF PURCHASE PRICE | 10/1/99 - 10/4/99 | - |
| 105789231 | 5% OFF PURCHASE PRICE | - | - |
| 105789232 | ACME TORTELLINI FOR $0.50 | - | ACME TORTELLINI |

FIG. 16

| ENCODING SCHEME IDENTIFIER 468 | DESCRIPTION 470 |
|---|---|
| 880 | DIGITS 4-6 INDICATE A REQUIRED ITEM, DIGITS 7-9 INDICATE A PERCENTAGE DISCOUNT APPLIED TO THE REQUIRED ITEM |
| 881 | DIGITS 4-7 INDICATE A PERCENTAGE DISCOUNT APPLIED TO PURCHASE PRICE, REMAINING DIGITS IGNORED |
| 882 | DIGITS 4-9 INDICATE AN EXPIRATION DATE, DIGITS 10-12 INDICATE AN AMOUNT BY WHICH THE PURCHASE PRICE IS REDUCED |

FIG. 19

METHOD AND APPARATUS FOR GENERATING A COUPON

The present application is a continuation application of commonly-owned U.S. patent application Ser. No. 09/076,409, entitled METHOD AND APPARATUS FOR GENERATING A COUPON, filed May 12, 1998, and which issued as U.S. Pat. No. 6,298,329 B1 on Oct. 2, 2001; which is a continuation-in-part application of U.S. patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, which issued as U.S. Pat. No. 6,119,099 on Sep. 12, 2000; which is a continuation-in-part of patent application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997, which issued as U.S. Pat. No. 6,267,670 B1 on Jul. 31, 2001.

CROSS-REFERENCE TO RELATED APPLICATIONS

This application is related to the following commonly-owned co-pending U.S. patent applications, each assigned to the assignee of the present invention and filed on Mar. 20, 1998: U.S. patent application Ser. No. 09/045,386 entitled "METHOD AND APPARATUS FOR CONTROLLING THE PERFORMANCE OF A SUPPLEMENTARY PROCESS AT A POINT-OF-SALE TERMINAL" filed in the name of Jay S. Walker et al; U.S. patent application Ser. No. 09/045,036, entitled "METHOD AND APPARATUS FOR FACILITATING THE PLAY OF FRACTIONAL LOTTERY TICKETS UTILIZING POINT-OF-SALE TERMINALS" filed in the name of Jay S. Walker et al; U.S. patent application Ser. No. 09/045,084 entitled "METHOD AND APPARATUS FOR CONTROLLING OFFERS THAT ARE PROVIDED AT A POINT-OF-SALE TERMINAL" filed in the name of Andrew S. Van Luchene, which issued as U.S. Pat. No. 6,223,163 B1 on Apr. 24, 2001; U.S. patent application Ser. No. 09/045,518 entitled "METHOD AND APPARATUS FOR PROCESSING A SUPPLEMENTARY PRODUCT SALE AT A POINT-OF-SALE TERMINAL" filed in the name of Andrew S. Van Luchene; and now abandoned U.S. patent application Ser. No. 09/045,347 "METHOD AND APPARATUS FOR PROVIDING A SUPPLEMENTARY PRODUCT SALE AT A POINT-OF-SALE TERMINAL" filed in the name of Dean P. Alderucci.

FIELD OF THE INVENTION

The present invention relates to methods and apparatus for generating coupons.

BACKGROUND OF THE INVENTION

Point-of-sale ("POS") terminals, such as cash registers, are used in a wide variety of businesses for performing such processes as calculating the total price of a purchase (goods or services) and calculating the amount of change due to a customer. In addition, POS terminals may also be used to read and process coupons used by a customer. Some POS terminals are further able to print coupons for customers.

Businesses typically offer coupons to customers in an attempt to promote many objectives. One such objective is to entice customers to visit the business. Coupons may further entice customers to visit the business more frequently. For example, a coupon may have an expiration date, and so the customer must use the coupon before that date or not at all. Businesses may also promote certain items by offering coupons which provide a discount only when those items are included in a purchase.

Offering higher-value coupons to customers typically allows a business to more effectively promote their objectives, such as customer retention. However, the redemption of higher-value coupons typically reduces the profit gained by the business.

It would be advantageous to provide a method and apparatus for generating coupons that allowed a business to more effectively promote its various objectives.

SUMMARY OF THE INVENTION

It is an object of the present invention to provide a method and apparatus for generating coupons that allowed a business to more effectively promote its various objectives.

In accordance with the present invention, a POS terminal generates a purchase price of a purchase, and generates a rounded price. The rounded price may be, for example, the lowest whole number greater than the purchase price. The POS terminal then calculates a round-up amount (change due the customer) as the difference between the purchase price and the rounded price. The coupon value is set based on the round-up amount. For example, the coupon may be redeemable for triple the amount of change due. The POS terminal prints on the coupon an identifier, such as a bar code, that is based on the coupon value. The bar code allows the coupon to be read by a POS terminal when the coupon is redeemed.

BRIEF DESCRIPTION OF THE DRAWINGS

FIG. 5 is a schematic illustration of a rounding multiple database of the POS terminal of FIG. 1.

FIG. 6 is a schematic illustration of another embodiment of the rounding multiple database of the POS terminal of FIG. 1.

FIG. 8 is a schematic illustration of a transaction database of the POS terminal of FIG. 1.

FIG. 9 is a schematic illustration of another embodiment of the transaction database of FIG. 8.

FIG. 16 is a schematic illustration of a coupon database of the POS terminal of FIG. 1.

FIG. 19 is an encoding scheme database of the POS terminal of FIG. 1.

DETAILED DESCRIPTION OF THE PREFERRED EMBODIMENTS

As described in the above-cited parent application of the present application, patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, a customer at a POS terminal may be offered an "upsell" in exchange for an amount of change he is due. The POS terminal determines an upsell in dependence on a purchase of the customer, and can also determine an upsell price to be the amount of change due that customer. Accordingly, the upsell price is based on the purchase. For example, a customer purchasing a first item for $1.74 and tendering $2.00 may be offered a second item in exchange for the $0.26 change due. The upsell price, $0.26, thus depends on the purchase price $1.74.

As also described in the above-cited parent application, one type of upsell that may be offered for change due is a voucher which is redeemable for a product or a discount thereon (hereinafter a "coupon"). The coupon may have a value to a customer which is greater than the value of the change exchanged therefor. By providing coupons for change in accordance with the present invention, a business can reduce the time between visits by customers and increase customer satisfaction, thereby increasing sales.

The description below is arranged into the following sections: Rounding a Purchase Price, Determining a Coupon Value, Setting a Coupon Feature, and Printing a Coupon.

Rounding a Purchase Price

Figure 1:
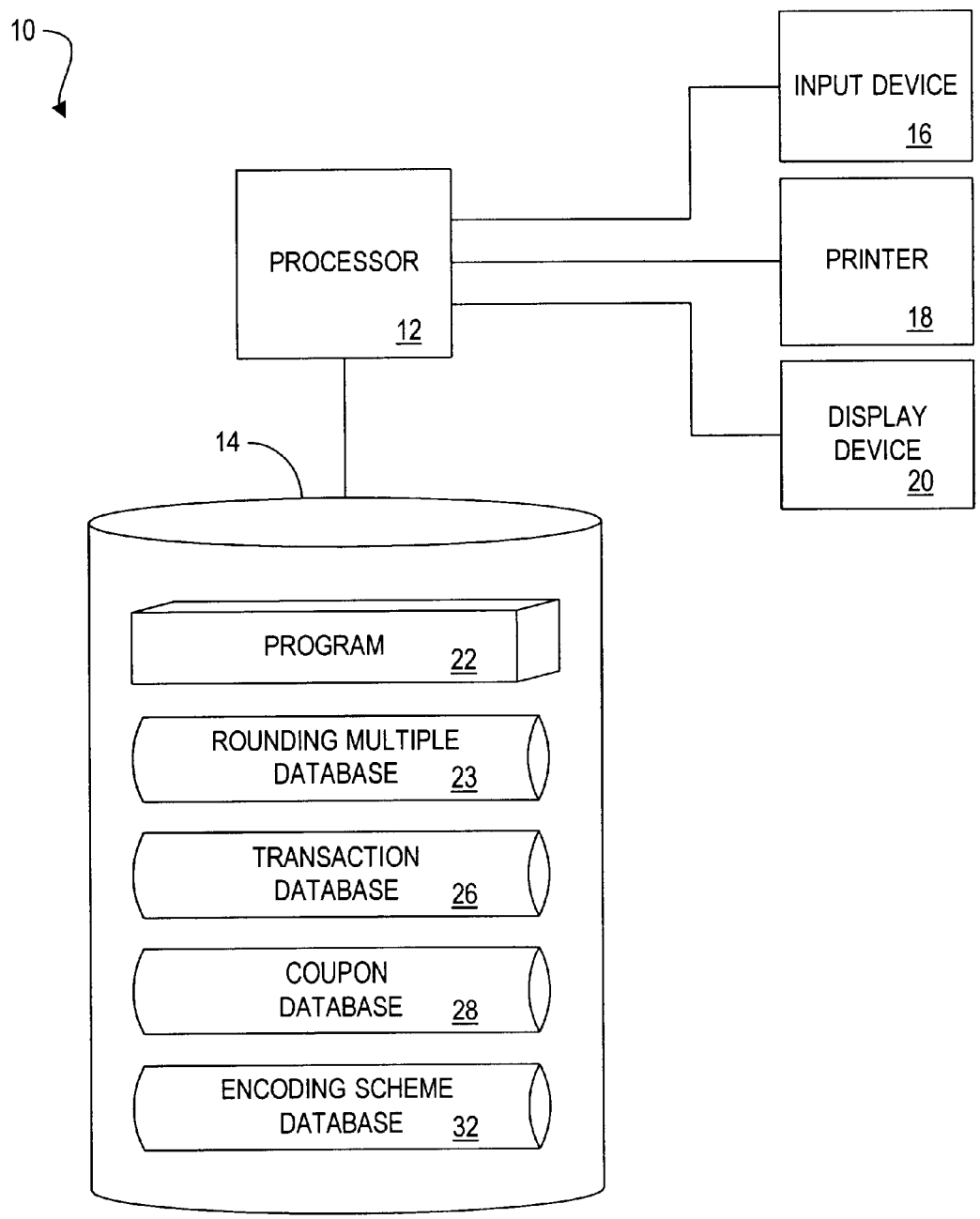
FIG. 1 is a schematic illustration of a POS terminal provided in accordance with the present invention.

Referring to FIG. 1, a POS terminal 10, which may be the IBM 4683 or IBM 4693 manufactured by International Business Machines, comprises a processor 12, such as one or more conventional microprocessors. The processor 12 is in communication with a data storage device 14, such as an appropriate combination of magnetic, optical and/or semi-conductor memory. The processor 12 and the storage device 14 may each be (i) located entirely within a single computer or other computing device; (ii) connected to each other by a remote communication medium, such as a serial port cable, telephone line or radio frequency transceiver; or (iii) a combination thereof. For example, the POS terminal 10 may comprise one or more computers that are connected to a remote server computer for maintaining databases.

An input device 16 comprises a keypad for transmitting input signals, such as signals indicative of a purchase, to the processor 12. The input device may also comprise a bar code scanner for reading bar codes, such as those printed on packaging, coupons and receipts. The input device may further comprise a card reader, such as those for reading credit cards and frequent shopper cards. A printer 18 registers indicia on paper or other material, thereby printing receipts and coupons as commanded by the processor 12. A display device 20 is preferably a video monitor for displaying at least alphanumeric characters to the customer and/or cashier. Many types of input devices, printers and display devices are known to those skilled in the art, and need not be described in detail herein. The input device 16, printer 18 and display device 20 are each in communication with the processor 12.

The storage device 14 stores a program 22 for controlling the processor 12. The processor 12 performs instructions of the program 22, and thereby operates in accordance with the present invention, and particularly in accordance with the methods described in detail herein. The program 22 furthermore includes program elements that may be necessary, such as an operating system and "device drivers" for allowing the processor 12 to interface with computer peripheral devices, such as the input device 16, the printer 18 and the display device 20. Appropriate device drivers and other necessary program elements are known to those skilled in the art, and need not be described in detail herein.

The storage device 14 also stores (i) a rounding multiple database 23; (ii) a transaction database 26; (iii) a coupon database 28; and (iv) an encoding scheme database 32. The databases 23, 26, 28 and 32 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 2:
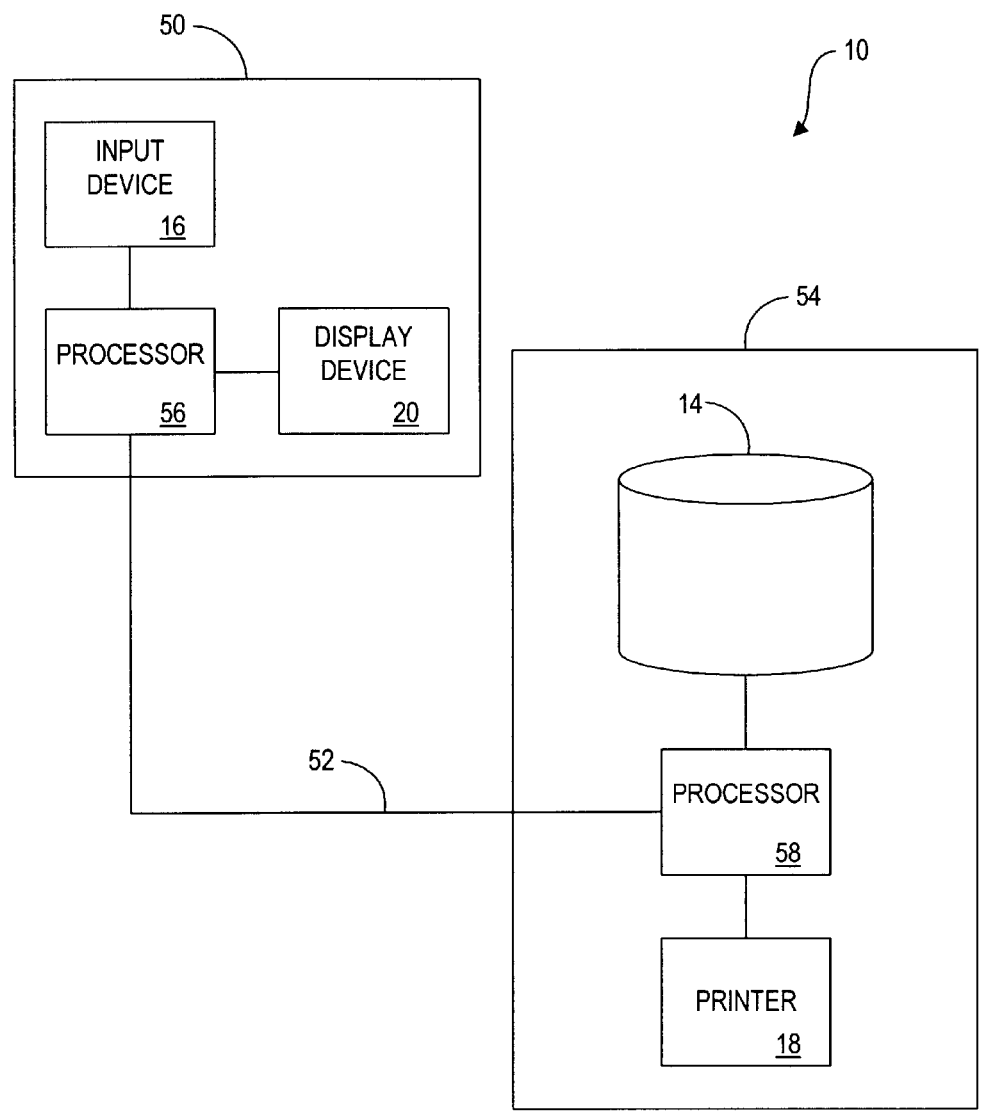
FIG. 2 is a schematic illustration of another embodiment of a POS terminal.

FIG. 2 illustrates another embodiment of the POS terminal 10, in which a control device 50 is in communication via a communication medium 52 with a system 54 for providing an offer. The control device 50 comprises a processor 56 in communication with the input device 16 and the display device 20. The system 54 for providing an offer comprises a processor 58 in communication with the storage device 14 and the printer 18. In this embodiment, the control device 50 may be a cash register, and the system 54 may be an electronic device for printing coupons in accordance with data received from the cash register. Other configurations of the POS terminal 10 will be understood by those skilled in the art.

Figure 3:
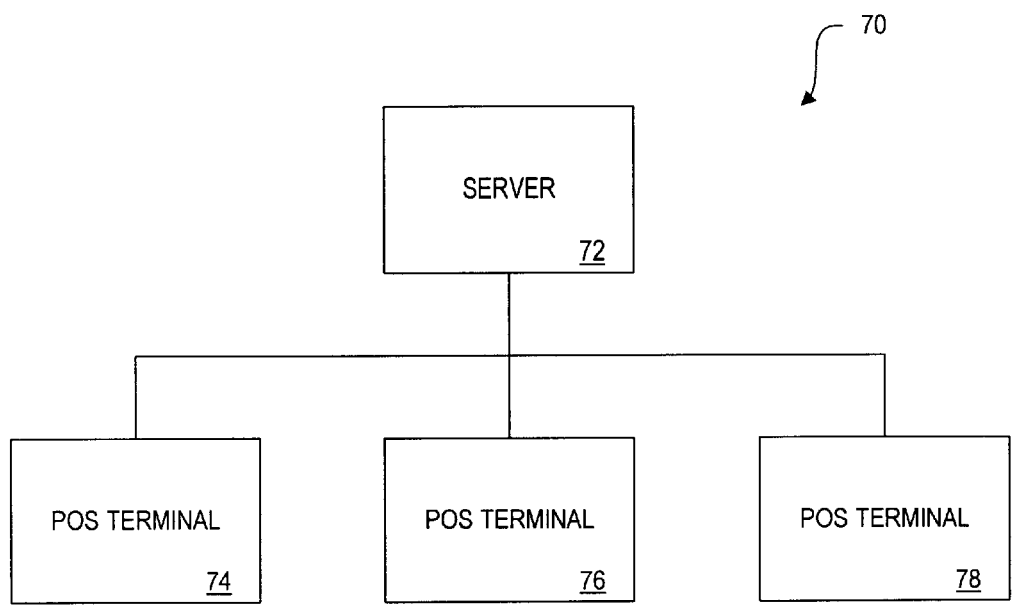
FIG. 3 is a schematic illustration of a network of POS terminals.

Referring to FIG. 3, a network 70 includes a server 72 in communication with POS terminals 74, 76 and 78. The server 72 directs the operation of, stores data from, and transmits data to the POS terminals 74, 76 and 78. The server 72 may itself be a POS terminal, as described above, or may be another computing device that can communicate with one or more POS terminals. Although three POS terminals are shown in FIG. 3, any number of POS terminals may be in communication with the server 72 without departing from the spirit and scope of the present invention. Each of the POS terminals 74, 76 and 78 may be located in the same store, in different stores of a chain of stores, or in other locations. The server 72 may perform many of the processes described below, especially those processes that are performed for more than one POS terminal. The server 72 may furthermore store data such as the transaction database 26.

Figure 4:
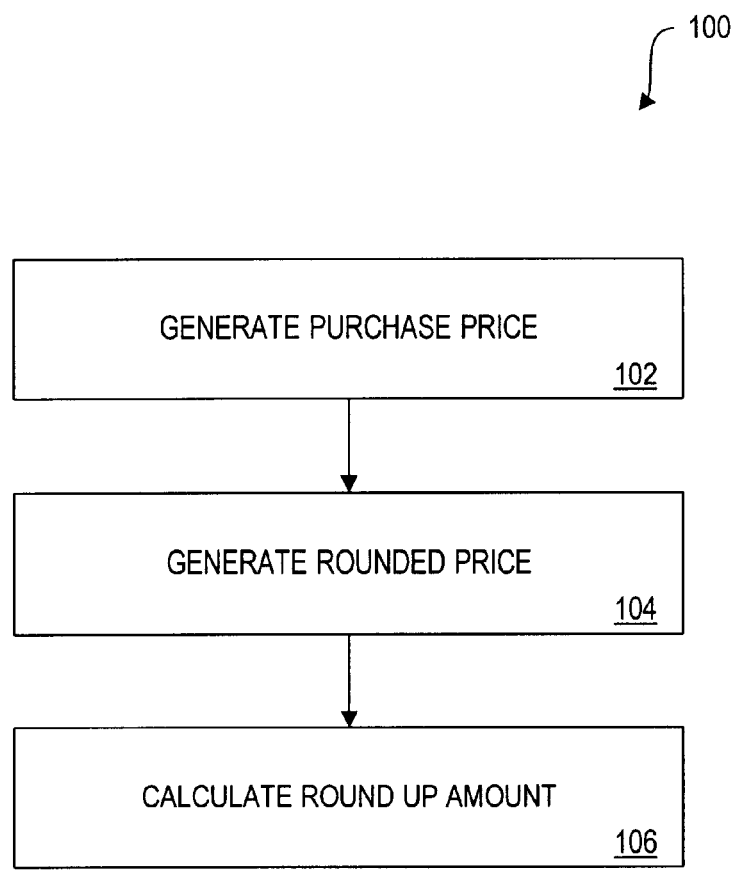
FIG. 4 is a flow chart illustrating a method for determining an amount of change due.

Referring to FIG. 4, a method 100 is performed by a POS terminal in determining an amount of change due. A purchase price of a purchase is generated (step 102). The step 102 of generating a purchase price may comprise, for example, (i) pressing keys on the input device 14 (FIG. 1a) which each correspond to a product; (ii) pressing numeric keys on the input device 14 which correspond to the digits of the purchase price; (iii) reading a bar code that indicates a price of one or more items included in a purchase; or (iv) receiving digital signals indicative of a purchase price from a remote computing device.

The POS terminal then generates a "rounded" price (step 104), and calculates a round-up amount (step 106) equal to the difference between the purchase price and the rounded price. The rounded price may be generated in many ways, as described in more detail below.

The rounded price may be based on the purchase price. For example, the rounded price may be the smallest whole number dollar amount that is greater than the purchase price, the smallest multiple of five dollars amount that is greater than the purchase price, or the amount of money tendered by the customer to pay for the purchase price, which may or may not be a whole number amount of dollars. When the rounded price is a whole number, the customer can easily tender bills and in turn receive, at his discretion, either (i) no change, or (ii) change which consists solely of bills, not coins. When the rounded price is a multiple of large-denomination coins, such as nickels, dimes, quarters or half dollars, the customer can receive change that consists solely of coins the customer desires, such as quarters.

In another embodiment, the POS terminal determines a rounding multiple that corresponds to the purchase price. The purchase price is then rounded in accordance with the rounding multiple to generate the rounded price. For example, referring to FIG. 5, the rounding multiple database 23 of FIG. 1 includes entries 122, 124, 126 and 128, each defining a rounding multiple for a range of purchase prices. Each entry (also called a "record") includes a range of purchase prices 130 and a rounding multiple 132.

The rounding multiple database 23 may be used to determine a rounding multiple and thus a rounded price. For example, if a purchase price is $8.27, the entry 124 (which indicates a range of purchase prices that includes $8.27) corresponds to that purchase price. The entry 124 also indicates a rounding multiple $5, and thus the rounding multiple $5 corresponds to the purchase price $8.27. The purchase price $8.27 is rounded in accordance with the rounding multiple $5, thereby generating a rounded price of $10. Accordingly, the round-up amount is $1.73 ($10-$8.27=$1.73).

The rounded price may also be based on items included in the purchase. In one embodiment, generating the rounded price comprises determining whether a predetermined item is included in the purchase. Typically, the predetermined item is selected to be a high-value good, so that inclusion of the predetermined item indicates a willingness to pay a higher rounded price. The rounded price could then be set greater if the predetermined item was included.

For example, the POS terminal may determine whether the purchase includes a swordfish steak. If so, the rounded price is set greater than it would otherwise be set. Thus, the rounded price is set to a first value (e.g. $15) if the purchase does not include a predetermined item, and is set to a second (greater) value (e.g. $20) otherwise. The first value and the second value are based on the purchase price. For example, the first value may be the purchase price rounded to a first rounding multiple (e.g. $5), and the second value may be the purchase price rounded to a second (higher) rounding multiple (e.g. $10). In such an embodiment, the rounding multiple could be determined based on whether the purchase includes a predetermined item.

Referring to FIG. 6, another embodiment 138 of the rounding multiple database includes an entry 140 defining rounding multiples to use based on whether a predetermined item is included or is not included in the purchase. The entry 140 includes (i) an indication 142 of the item; (ii) a rounding multiple 144 to use if the item is included; and (iii) a rounding multiple 146 to use if the item is not included. For example, if the purchase price is $26.83, and the purchase includes a swordfish steak, then the rounding multiple $10 is used. The purchase price is rounded in accordance with the rounding multiple to generate a rounded price $30. Conversely, if the purchase does not include a swordfish steak, then the rounding multiple $1 is used, and the purchase price would be rounded to generate a rounded price $27.

Similarly, generating the rounded price can comprise determining whether a premium item is included in the purchase. A premium item is an item that indicates a willingness to pay a higher rounded price. A premium item may be any of a set of predetermined items, such as high-margin items. Alternatively, premium items may be goods which are determined to have a high margin or a high price compared with available substitutes. As described above, the rounded price, or a rounding multiple, can be based on inclusion of such premium items in the purchase.

In certain situations, rounding a purchase price in accordance with different rounding multiples will yield the same rounded price. For example, rounding the purchase price $29.03 to the nearest $1 or to the nearest $10 will yield the same rounded price ($30). In such a situation, it may be desirable to increase the rounded price when the rounding multiple $10 is used, so that the resulting rounded price is assured to be greater than when the rounding multiple is $1. For example, referring to Table 1 below, an "increase" may be applied to guarantee that the rounded price is greater when the rounding multiple is greater.

TABLE 1

First Rounding Example

| Purchase Price | Rounding Multiple | Increase | Rounded Price |
|---|---|---|---|
| $29.03 | $1 | $0 | $30 |
| $29.03 | $10 | $2 | $32 |

The increase may be established so that the round-up amount is within a predetermined range. For example, if a business desires to exchange a predetermined item in exchange for at least $0.85, the increase may be established at $1.00 so that a round-up amount is always greater than $0.85. The rounded price may be generated in other ways that are based on the price of the predetermined item, thereby allowing the predetermined item to be exchanged for change due.

In still another embodiment, the rounded price may be generated based on the highest-priced item in the purchase. The maximum price of all the prices would indicate a willingness to pay a higher rounded price. For example, referring to Table 2 below, a rounding multiple may be determined from the highest price item. The purchase price is then rounded in accordance with the rounding multiple to generate a rounded price, as described above.

TABLE 2

Second Rounding Example

| Highest Priced Item | Rounding Multiple |
|---|---|
| <$5 | $1 |
| $5–$9.99 | $2 |
| $10–$14.99 | $5 |
| $15 or more | $10 |

Once the round-up amount is determined, an upsell to offer in exchange for the round-up amount is determined as well. The upsell is offered to the customer, and, if accepted, the upsell is exchanged for the change due. If the offer is accepted, an indication of such acceptance can be stored for later use. For example, based on historic acceptances of particular offers, different upsells may be offered.

Determining a Coupon Value

Figure 7:
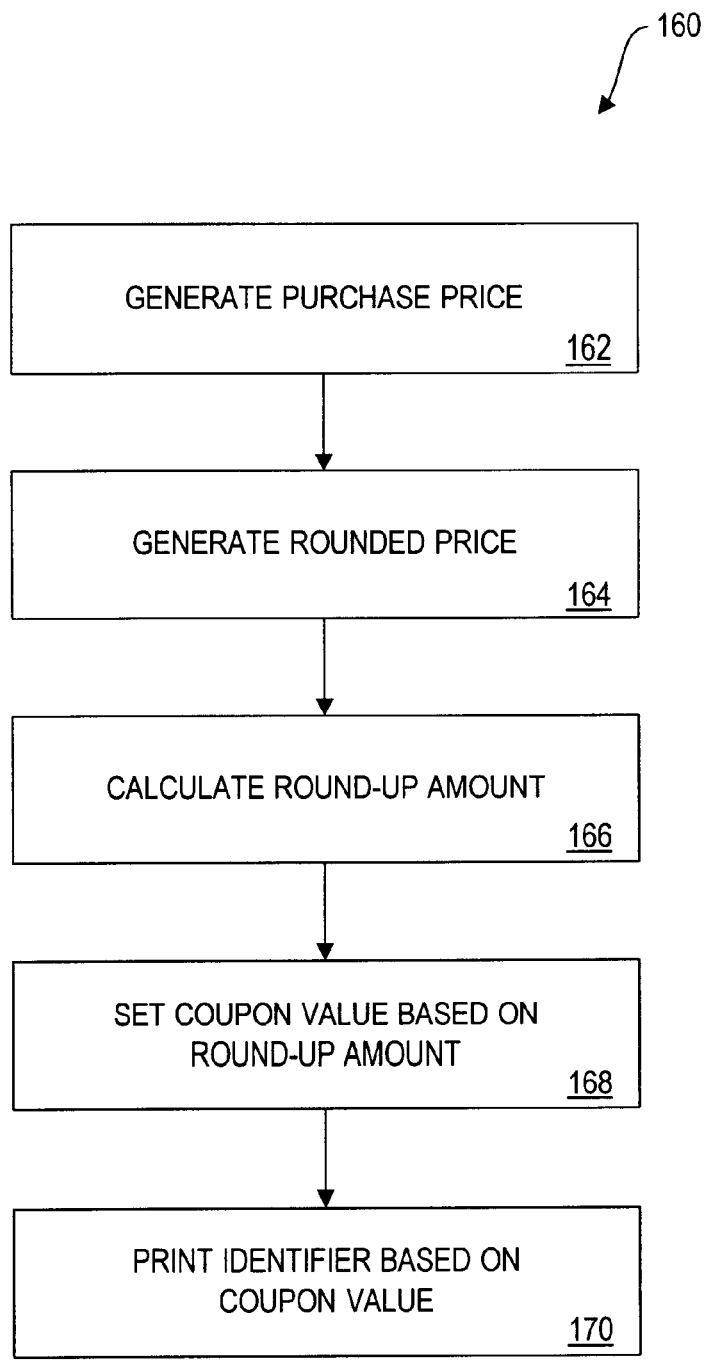
FIG. 7 is a flow chart illustrating a method for generating a coupon.

Referring to FIG. 7, a method 160 is performed by a POS terminal in generating a coupon. As described above, the POS terminal generates a purchase price and a rounded price (steps 162 and 164), and in turn calculates a round-up amount (step 166). The POS terminal then sets a coupon value based on the round-up amount (step 168). Next, the POS terminal prints on the coupon an identifier that is based on the coupon value (step 170), as is discussed in further detail below The coupon value can be expressed as a (typically reduced) price for an item or the purchase, or a reduction in the price of an item or the purchase. The reduction may be expressed in many ways, such as a percentage discount or a fixed amount that is to be subtracted from the price.

The coupon value is typically based on the round-up amount, and may in particular be based on a predetermined multiple of the round-up amount. For example, the coupon value may be set to three times the round-up amount. In such an embodiment, a customer can be offered a coupon worth $0.99 for his $0.33 change due.

The POS terminal may furthermore set the coupon value based on the round-up amount and a condition. Several conditions may be used, and selection of desirable conditions will typically be dictated by various business goals.

One condition is whether the customer uses a coupon in paying for the current purchase. In such an embodiment, the POS terminal provides a greater-value coupon to customers that are less likely to redeem coupons (i.e. customers that do not redeem a coupon in the current transaction). Customers that are less likely to redeem coupons will typically require a greater value coupon in exchange for their change due. Accordingly, the POS terminal determines whether the purchase includes coupon redemption. For example, coupons may be scanned by a bar code scanner and thus read by the POS terminal to indicate coupon redemption. Alternatively, various buttons on the input device 16 (FIG. 1) may be actuated to indicate coupon redemption.

If the purchase includes coupon redemption, the coupon value is set to a first value. If the purchase does not include coupon redemption, the coupon value is set to a second value greater than the first value. Both the first value and the second value are based on the round-up amount. For example, a customer that redeems a coupon in his purchase may be provided with a coupon worth twice his change, while a customer that does not redeem a coupon in his purchase may be provided with a coupon worth triple his change.

Another condition is previous coupon redemption by the customer. As described above, the POS terminal provides a greater-value coupon to customers that are less likely to redeem coupons (i.e. customers that historically have not redeemed coupons much or at all). In such an embodiment, the POS terminal receives a customer identifier, such as a frequent shopper number, that uniquely identifies the customer. Based on the customer identifier, the customer's historical coupon redemption is measured. The historical coupon redemption may be, for example, the number of coupons redeemed or the ratio of coupons redeemed to number of purchases.

Referring to FIG. 8, the transaction database 26 (FIG. 1) includes entries 200, 202, 204 and 206, each defining transactions (purchases) made by a customer. Each entry includes (i) a customer identifier 208 that uniquely identifies a customer; (ii) a number of purchases 210 that the customer has made; (iii) a number of coupons redeemed 212; and (iv) an average number of coupons redeemed per purchase 214, which is the ratio of the number of coupons redeemed 212 to the number of purchases 210. As desired, further information may be stored for each entry, such as items purchased in each transaction and dates of transactions.

When a customer initiates a transaction using a frequent shopper card, the POS terminal receives the customer identifier from a card reader or similar device. The POS terminal may then update the corresponding entry of the transaction database 26, for example, by increasing the number of purchases and number of coupons redeemed accordingly. When generating a coupon, the POS terminal likewise determines the coupon redemption that is based on the customer identifier, and sets the coupon value based on the coupon redemption. The coupon redemption may be explicitly stored in the transaction database 26, or may be calculated from data stored therein.

Referring to Table 3, there is shown an exemplary set of coupon values for various ranges of coupon redemption. Such information on coupon values may be stored in the storage device 14 (FIG. 1). In this embodiment, coupon redemption is expressed as the average number of coupons redeemed per purchase.

TABLE 3

Coupon Value Based on Coupon Redemption

| Coupon Redemption | Coupon Value |
|---|---|
| 0–0.25 | Quadruple the Change Due |
| 0.26–0.5 | Triple the Change Due |
| 0.51–1.0 | Double the Change Due |
| >1.0 | Change Due |

For example, referring again to FIG. 8, the entry 204 defines an average number of coupons redeemed per purchase of 0.36. Table 3 in turn indicates that a coupon redemption of 0.36 corresponds to coupon value that is triple the change due. Accordingly, in this situation the amount of change due is multiplied by three to generate the coupon value. To many customers, such a "triple-change" coupon is more attractive than simply receiving the change due. Such customers are more likely to accept an offer for the coupon.

In addition, it can be further advantageous to provide a greater coupon value to customers periodically. For example, the coupon value of the coupon offered to the customer may be increased on every tenth transaction, or on every tenth coupon redeemed. Accordingly, in some embodiments the coupon value is increased if the number of transactions or number of coupons redeemed corresponds to a multiple of a predetermined number (e.g. a multiple of ten).

Another condition is the payment type used in paying for the current purchase. The POS terminal can determine a payment type and set the coupon value based on the payment type. The payment type may be, for example, a credit card, a debit card, currency (coins and bills) or a check. The POS terminal can determine the payment type by actuation of keys provided in the input device 16 (FIG. 1) or from various devices such as card readers.

It is particularly advantageous to provide a greater-value coupon to customers that use a payment type other than currency (e.g. credit card or check). Such customers are able to pay exact amounts and thus do not have to receive any change. Accordingly, customers that use a payment type other than currency should be provided with more of an advantage to pay a rounded amount and accept a coupon in return for change due. The POS terminal can determine whether the payment type is currency and, if so, set the coupon value to a first (lower) value. Otherwise, the coupon value is set to a second (higher) value.

Another condition is whether the customer uses a frequent shopper card in the current transaction. It is particularly advantageous to provide a greater-value coupon to customers that use a frequent shopper card, since customers then have an incentive to register for the frequent shopper program. The business in turn benefits since the transactions of registered customers can be readily tracked. The POS terminal can determine whether a frequent shopper card is used by actuation of keys provided in the input device 16 (FIG. 1) or from various devices such as card readers. Use of a frequent shopper card causes the POS terminal to receive a frequent shopper identifier (e.g. a frequent shopper number). If a frequent shopper identifier is received, the coupon value is set to a higher value. Otherwise, the coupon value is set to a lower value.

Another condition is the acceptance rate of offers for upsells. It is particularly advantageous to provide a greater-value coupon to customers that have historically not accepted the offer for a coupon in exchange for their spare change. Such customers typically require an enhanced incentive to accept such offers. The POS terminal can receive a customer identifier from various devices such as card readers that read frequent shopper cards. The POS terminal then determines an acceptance rate based on the customer identifier, and sets the coupon value based on the acceptance rate.

For example, referring to FIG. 9, another embodiment 230 of the transaction database 26 (FIG. 1) includes entries 232, 234 and 236, each defining acceptances by a customer. Each entry includes (i) a customer identifier 238 that uniquely identifies a customer; (ii) a number of purchases 240 that the customer has made; (iii) a number of accepted upsell offers 242; and (iv) an acceptance rate 244. As desired, further information may be stored for each entry.

When a customer initiates a transaction using a frequent shopper card, the POS terminal receives the customer identifier from a card reader or similar device. The POS terminal may then update the corresponding entry of the transaction database, for example, by increasing the number of purchases and number of accepted upsell offers accordingly. When generating a coupon, the POS terminal likewise determines the historical acceptance rate that is based on the customer identifier, and sets the coupon value based on that acceptance rate. The acceptance rate may be explicitly stored in the transaction database, or may be calculated from data stored therein.

Referring to Table 4, there is shown an exemplary set of coupon values for various ranges of acceptance rates. In this embodiment, acceptance rate is expressed as the average number of acceptances per purchase.

TABLE 4

| Coupon Value Based On Acceptance Rate | |
|---|---|
| Acceptance Rate | Coupon Value |
| 0–0.25 | Triple the Change Due |
| 0.26–0.5 | Double the Change Due |
| 0.51–1.0 | Change Due |

For example, referring again to FIG. 9, the entry 232 defines an acceptance rate of 0.43 for a customer identified by "1234567". Table 4 in turn indicates that the acceptance rate of 0.43 corresponds to coupon value that is double the change due. Accordingly, in this situation the amount of change due to customer "1234567" is multiplied by two to generate the coupon value. To many customers, such a "double-change" coupon is more attractive than simply receiving the change due.

Setting a Coupon Feature

As described above, the POS terminal prints on the coupon an identifier that is based on the coupon value. In other embodiments, the identifier can be based on both the coupon value and a coupon feature. Such an embodiment allows more than just the value of the coupon to be set by the POS terminal. Accordingly, coupons can be better customized to promote business objectives.

Figure 10:
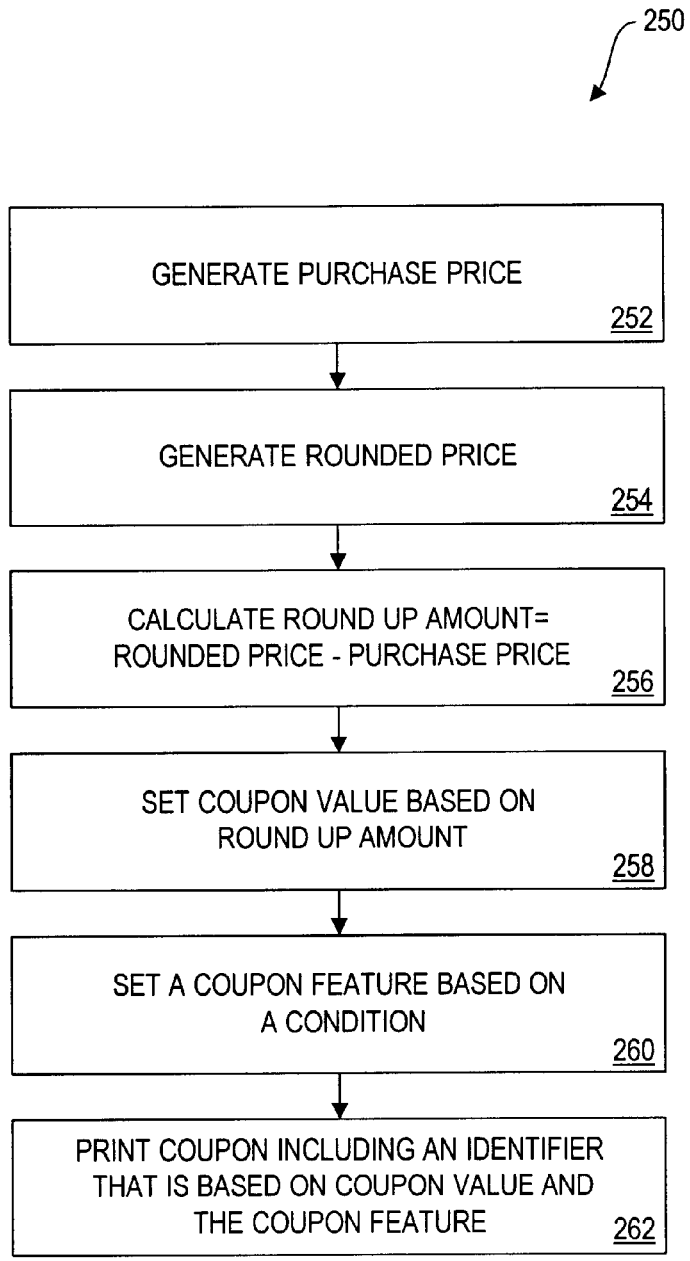
FIG. 10 is a flow chart illustrating another method for generating a coupon.

Referring to FIG. 10, a method 250 is performed by a POS terminal in generating a coupon. As described above, the POS terminal generates a purchase price and a rounded price (steps 252 and 254), and in turn calculates a round-up amount (step 256). The POS terminal then sets a coupon value based on the round-up amount (step 258), and sets a coupon feature based on a condition (step 260). The POS terminal then prints on the coupon an identifier based on the coupon value and the coupon feature (step 262).

A coupon feature is an aspect of the coupon that may assume one of a plurality of values. In the present invention, the POS terminal can set the coupon feature in accordance with various goals. Two types of coupon features that are discussed in detail herein are a validity period and a required item. Other coupon features will be understood by those skilled in the art.

A validity period of a coupon is a period during which the coupon may be redeemed. For example, the validity period may be defined by an expiration date, which defines the end of the validity period. A validity period may be predetermined times of the day, such as from 1:30 PM to 4:00 PM every weekday until Jan. 30, 1999.

In one embodiment, the validity period depends on the time since the last transaction of the customer. In such an embodiment, the POS terminal may set the validity period in order to prompt customers to return to the store sooner than they otherwise would have.

Figure 11:
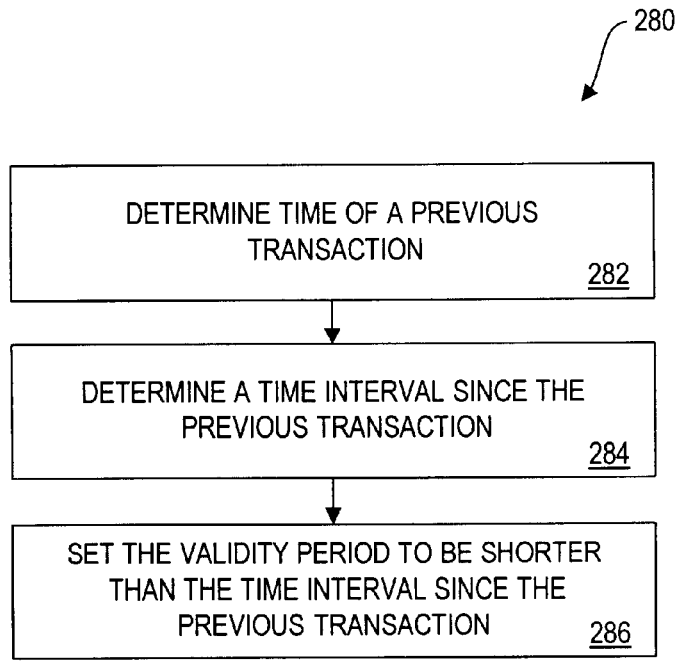
FIG. 11 is a flow chart illustrating a method for generating a coupon having a validity period.

Referring to FIG. 11, a method 280 is performed by a POS terminal in generating a coupon having a validity period. The POS terminal determines a time of a previous transaction (step 282). For example, if the customer uses a frequent shopper card in the current transaction, the POS terminal may determine the date that the same frequent shopper identifier (customer identifier) was last used in a transaction. The POS terminal can then determine the time interval since the previous transaction (step 284), for example, by calculating the number of days between the previous transaction and the current transaction. Then, the validity period of the coupon may be set based on the time interval since the previous transaction (step 286). For example, the validity period may be set to be shorter than the time interval since the previous transaction (e.g. one day shorter than that time interval).

In another embodiment, the validity period depends on the current time. In such an embodiment, the POS terminal may also set the validity period to prompt customers to return to the store sooner than they otherwise would have.

Figure 12:
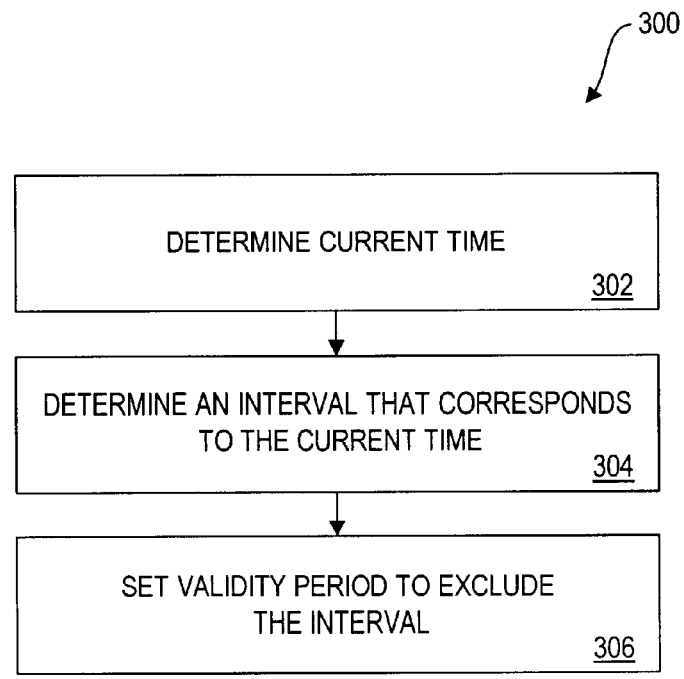
FIG. 12 is a flow chart illustrating another method for generating a coupon having a validity period.

Referring to FIG. 12, another method 300 is performed by a POS terminal in generating a coupon having a validity period. The POS terminal determines a current time (step 302). The current time may be expressed, for example, as the date, the day of the week, a time of day, or whether it is a weekday or weekend. The POS terminal then determines an interval that corresponds to the current time (step 304). For example, if the current time is expressed as "weekend" (as opposed to "weekday"), then the corresponding interval may be the following weekend.

Once the interval is determined, the validity period of the coupon is set to exclude the interval. For example, if the interval is the range from Saturday, Dec. 18, 1999 to Sunday, Dec. 19, 1999, a validity period that excludes that interval is the date range from Monday, Dec. 20, 1999 to Friday, Dec. 24, 1999. As another example, if the current time is 12:30 PM, then a corresponding interval is the range from 11:30 AM to 1:30 PM. A validity period that excludes this interval is "any weekday after 1:30".

A required item of a coupon is a coupon feature that indicates an item that must be purchased in order to redeem the coupon. For example, if a coupon is for "30% discount on a can of Acme corn", the required item is Acme corn, and the coupon value is a 30% reduction in the price of Acme corn.

In one embodiment, the required item is based on the historical coupon redemption of the customer. Customers that do not redeem many coupons are typically less likely to accept an offer for a coupon. Accordingly, such customers should be offered higher-value coupons than those customers that have greater coupon redemption. Thus, customers that have greater coupon redemption are offered a (relatively) lower-value coupon, such as a coupon for higher priced items, for higher margin items or for items the customer does not often purchase.

Figure 13:
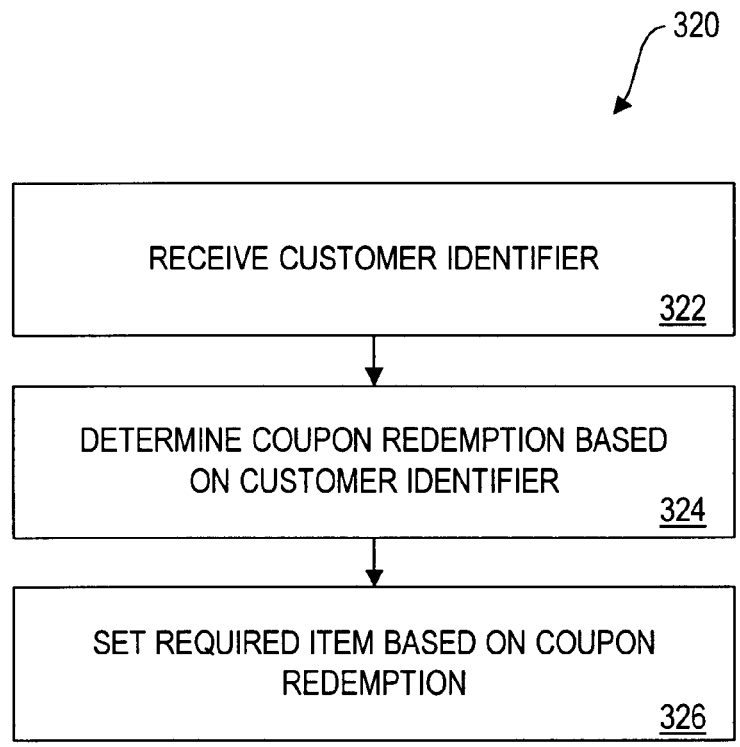
FIG. 13 is a flow chart illustrating a method for generating a coupon having a required item.

Referring to FIG. 13, a method 320 is performed by a POS terminal in generating a coupon having a required item. The POS terminal receives a customer identifier (step 322), such as a frequent shopper identifier that is read from a frequent shopper card. The POS terminal in turn determines the coupon redemption based on the customer identifier (step 324). Determining coupon redemption has been described above with reference to FIG. 8 and Table 3. The required item of the coupon is set based on the coupon redemption (step 326).

The step 326 can comprise setting the required item to be a predetermined item if the coupon redemption is greater than a predetermined threshold. For example, if a customer redeems coupons on every transaction (e.g., coupon redemption>0.9), it can be desirable to offer him a coupon for a high margin item, or some other predetermined item.

Figure 14:
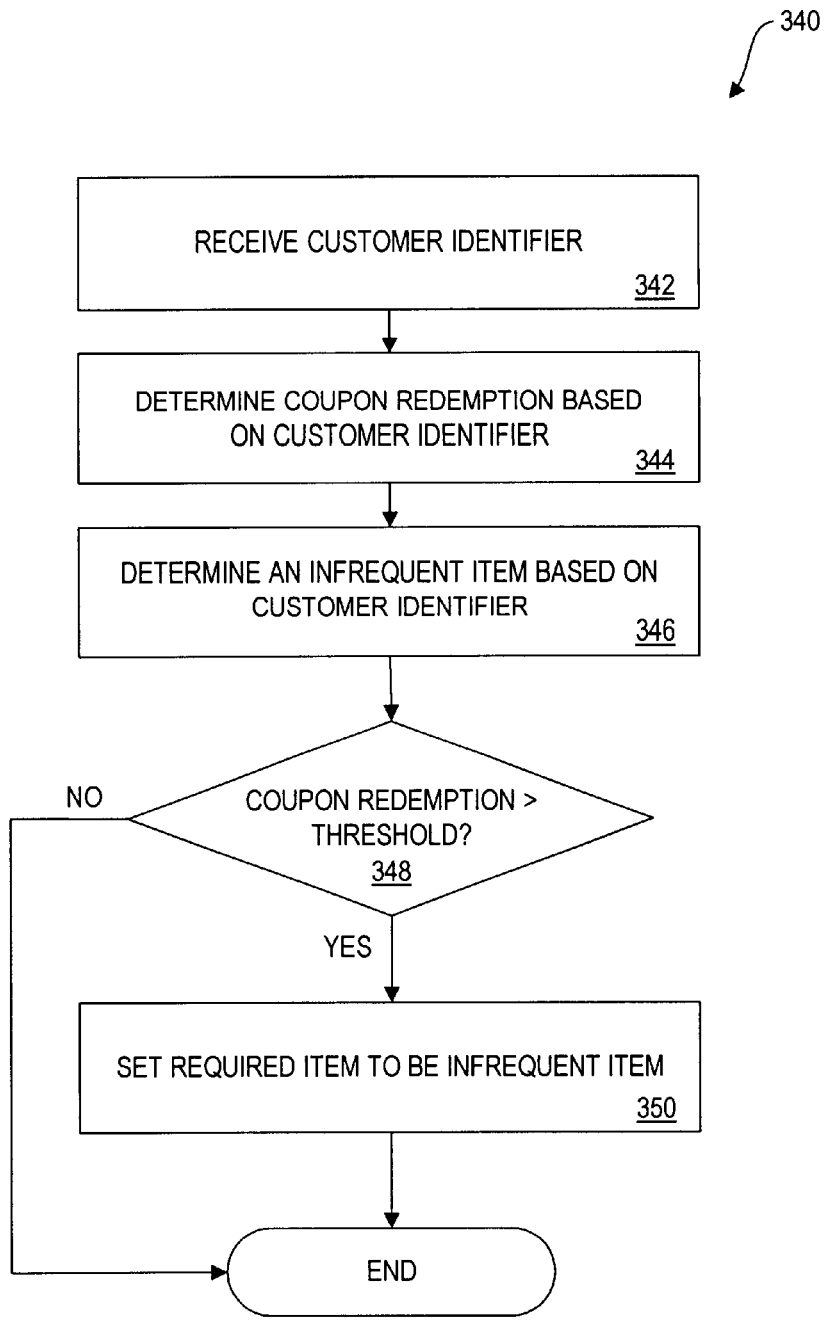
FIG. 14 is a flow chart illustrating another method for generating a coupon having a required item.

Referring to FIG. 14, another method 340 is performed by a POS terminal in generating a coupon having a required item. The POS terminal receives a customer identifier (step 342), such as a frequent shopper identifier that is read from a frequent shopper card. The POS terminal then determines the coupon redemption based on the customer identifier (step 344). Determining coupon redemption has been described above with reference to FIG. 8 and Table 3. The POS terminal also determines an "infrequent item" based on the customer identifier (step 346). An infrequent item is an item the customer has not previously purchased much or at all. As described above, the items previously purchased by a customer may be stored in the transaction database 26 (FIG. 1), and so infrequent items may be determined from the transaction database 26. An infrequent item may furthermore be an item the customer is unlikely to desire, as determined by past purchases of the customer. For example, if a customer's purchases have never included any pet food or pet supplies, it is unlikely that customer will desire an item such as a box of cat food.

If the coupon redemption is greater than a predetermined threshold (step 348), then the required item of the coupon is set to be the infrequent item (step 350). The predetermined threshold may be established to discriminate between customers that are likely to redeem coupons and those that are not.

Printing a Coupon

Once the coupon value and any appropriate coupon parameters are set, the POS terminal prints on a coupon an identifier that is based on the coupon value (and coupon parameters, if any). In one embodiment, the identifier comprises a bar code that may be read by bar code scanners in a known manner. The bar code may be of the one-dimensional or two-dimensional type, as will be apparent to those skilled in the art.

As is known in the art, a bar code codifies information, typically a sequence of digits. Accordingly, a bar code can represent one or more values, especially numeric values. In one embodiment of the present invention, the bar code indicates a record that stores a coupon value or a coupon feature. In other embodiments, the bar code itself encodes information such as a coupon value or a coupon feature.

Figure 15:
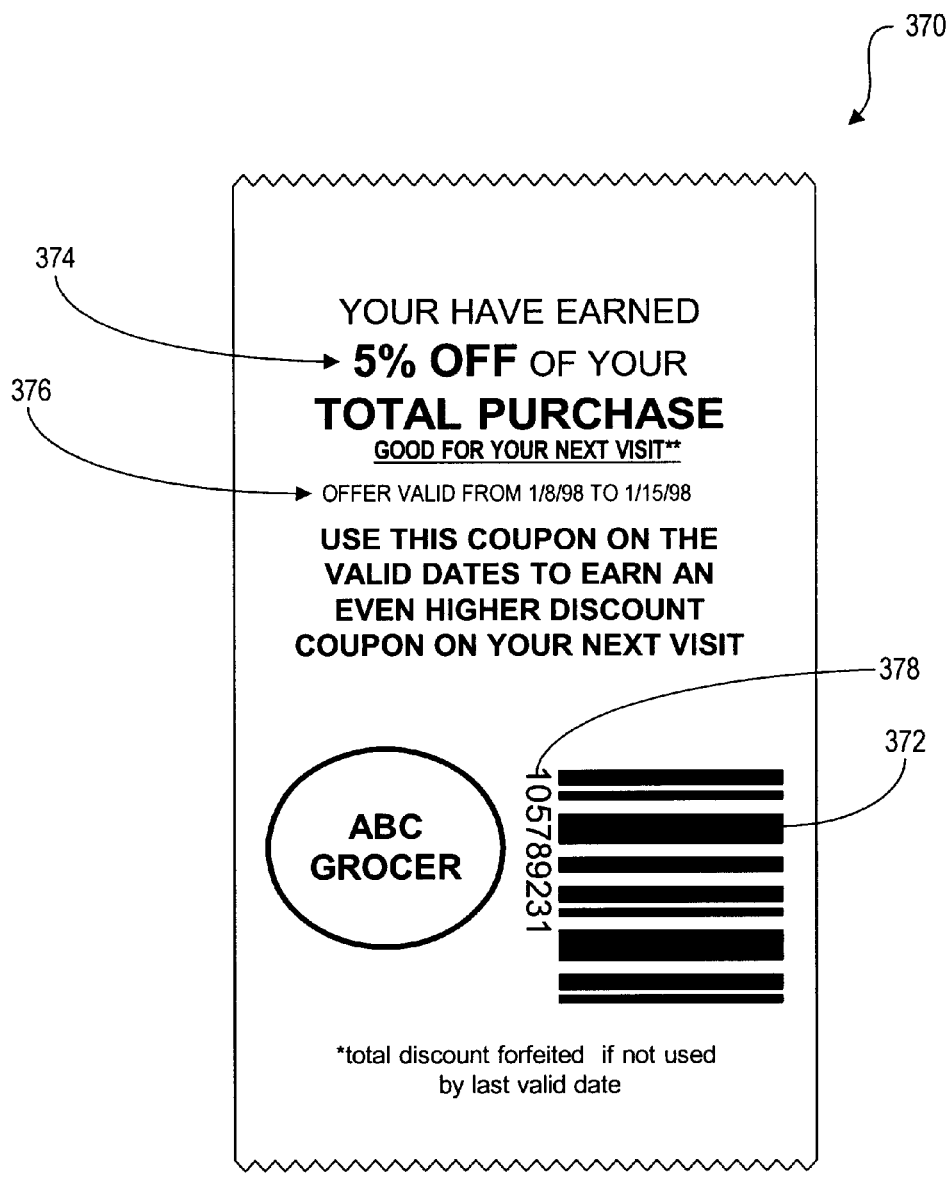
FIG. 15 is a schematic illustration of a coupon.

Referring to FIG. 15, a coupon 370 includes a bar code 372, text 374 describing the coupon value (5% discount on the purchase price), and text 376 describing the validity period. The bar code 372 represents a sequence of digits, and the sequence is described by text 378. The sequence of digits in the illustrated example is "105789231", which in this embodiment indicates a record that stores coupon information.

Referring to FIG. 16, the coupon database 28 (FIG. 1) includes entries 390, 392 and 394, each defining a coupon. Each entry includes (i) a coupon identifier 396 that uniquely identifies the coupon, and that corresponds to a bar code printed on the coupon; (ii) a coupon value 398; (iii) a validity period 400; and (iv) a required item 402. As described above, a coupon may or may not include a validity period and a required item. For example, the entry 392 indicates neither a validity period nor a required item.

Each entry of the coupon database 28 may correspond to a single physical coupon. Alternatively, each entry may correspond to many identical physical coupons. For example, the entry 394 may correspond to one hundred coupons that each may be redeemed for a $0.50 package of Acme tortellini. Each of these coupons would have a bar code that indicated the entry 394, and it can be desirable to also store an indication of the coupons redeemed.

In the above-described embodiment, the bar code printed on the coupon merely indicates where coupon information is stored. The bar code serves to identify information stored in an entry, so that the corresponding entry is determinable from the bar code. In other embodiments, the bar code encodes coupon information.

Figure 17:
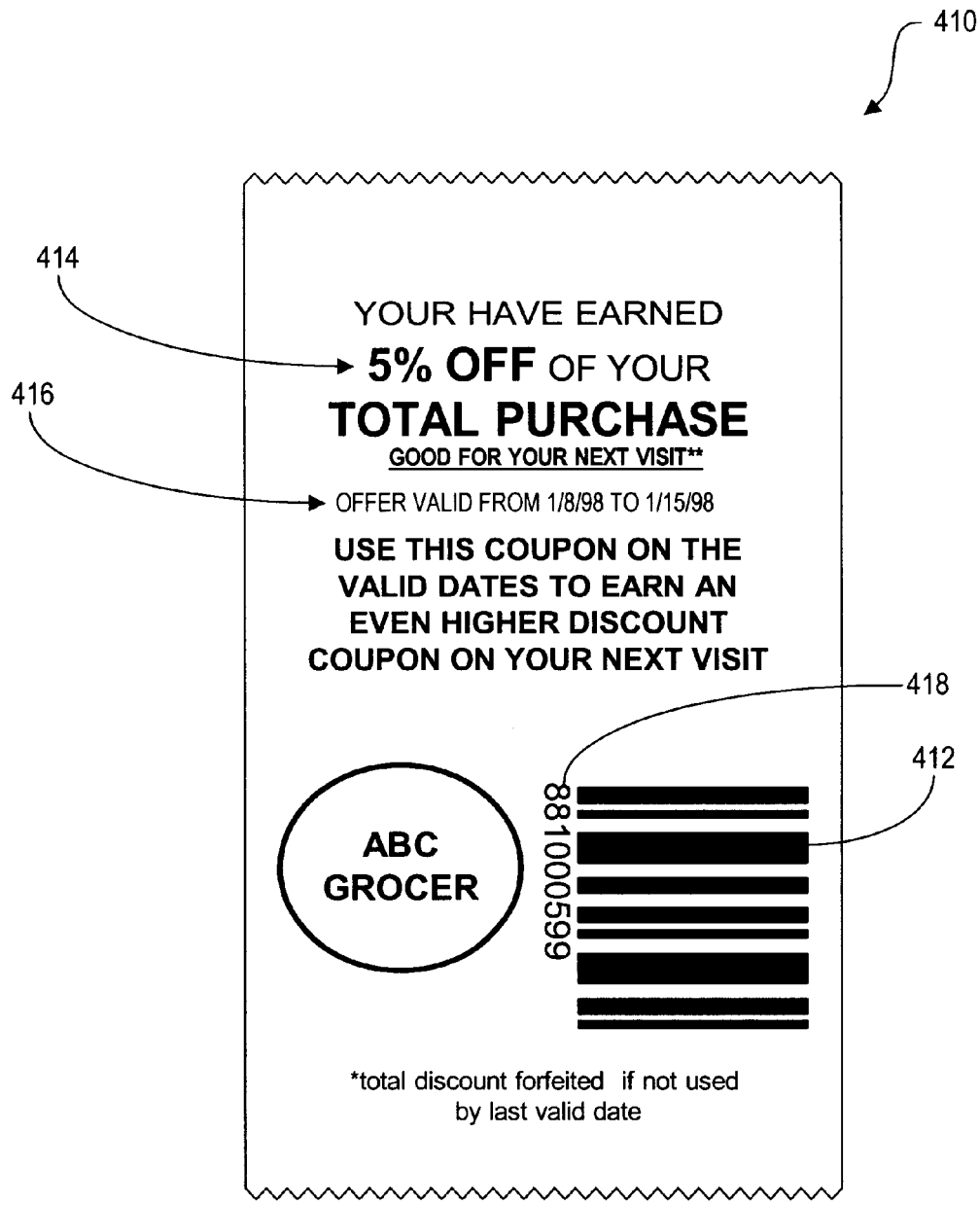
FIG. 17 is a schematic illustration of another coupon.

Referring to FIG. 17, a coupon 410 includes a bar code 412, text 414 describing the coupon value (5% discount on the purchase price), and text 416 describing the validity period. The bar code 412 represents a sequence of digits, and the sequence is described by text 418. The sequence of digits in the illustrated example is "881000599", and in this embodiment the sequence encodes coupon information. Thus, the coupon information is directly stored on the coupon, which can be more efficient in certain situations. For example, if the coupon itself stores required information, the coupon may be read by any machine that is able to interpret the encoding scheme used in creating the bar code. Thus, stores would not need to be in communication with a central database that stores the coupon information, and consequently a large variety of unrelated businesses would be able to read and redeem the coupon.

Figure 18:
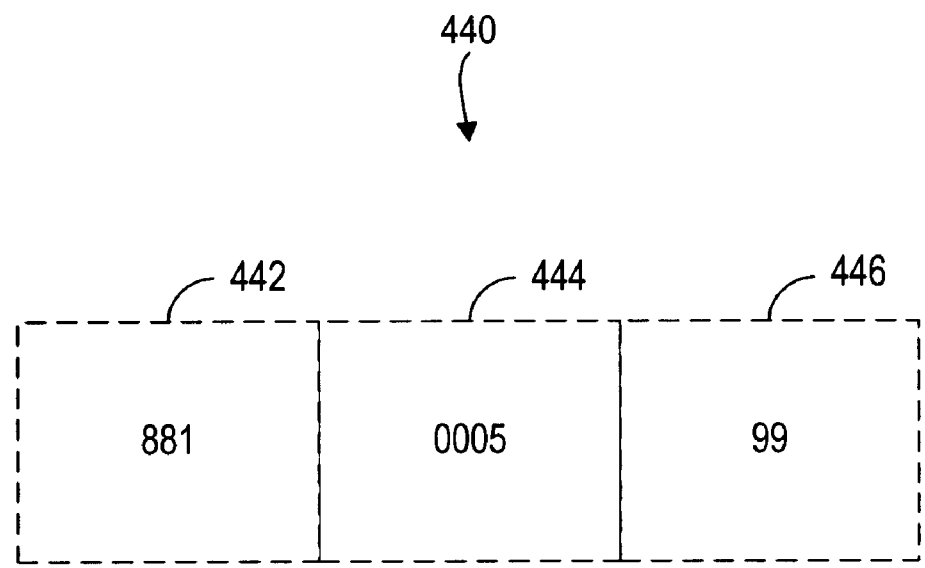
FIG. 18 is a schematic illustration of a sequence of digits printed on a coupon.

Referring to FIG. 18, the sequence of digits "881000599" printed on the coupon 410 (FIG. 17) is illustrated in further detail and indicated by reference numeral 440. The sequence of digits 440 can represent one or more values, and the representation described by FIG. 18 is but one example. A portion 442 of the sequence of digits 440 indicates the encoding scheme, which is described in more detail below. A portion 444 of the sequence of digits 440 indicates the percentage discount that is to be applied to the purchase price. Thus, the portion 444 defines the coupon value. A portion 446 comprises unused digits in the indicated encoding scheme.

Referring to FIG. 19, the encoding scheme database 32 includes entries 462, 464 and 466. Each entry defines how different information is indicated by the different digits of the bar code. Each entry includes (i) an encoding scheme identifier 468 that uniquely identifies the encoding scheme; and (ii) a description 470 of the corresponding encoding scheme. In the illustrated embodiment, the encoding scheme identifier is the first three digits of the bar code. For example, referring again to FIG. 19, the portion 442 indicates an encoding scheme "881". As shown by the entry 464, in the encoding scheme "881" the fourth through seventh digits (the portion 444 of FIG. 18) indicate a percentage discount applied to the purchase price. The entry 464 also shows that in the encoding scheme "881" the digits after the seventh digit are ignored, and so contain no further coupon information.

Alternatively, the identifier that is printed on the coupon may comprise text, rather than a bar code. For example, the coupon may include text that describes the coupon value and/or coupon features. A cashier operating the POS terminal could read the text, and in turn actuate appropriate keys of the POS terminal to indicate the coupon value.

As described above, upon acceptance by the customer, the coupon is printed and exchanged for change due (round-up amount). It can be desirable to print an indication of the change due on the coupon. Such an indication would permit the coupon to be readily returned for the round-up amount, which is the amount the customer originally "paid" for the coupon. For example, a customer may reconsider his acceptance and wish to have his change instead of the coupon. If the coupon includes an indication of the round-up amount, there is little ambiguity about what the customer paid for the coupon.

Figure 20:
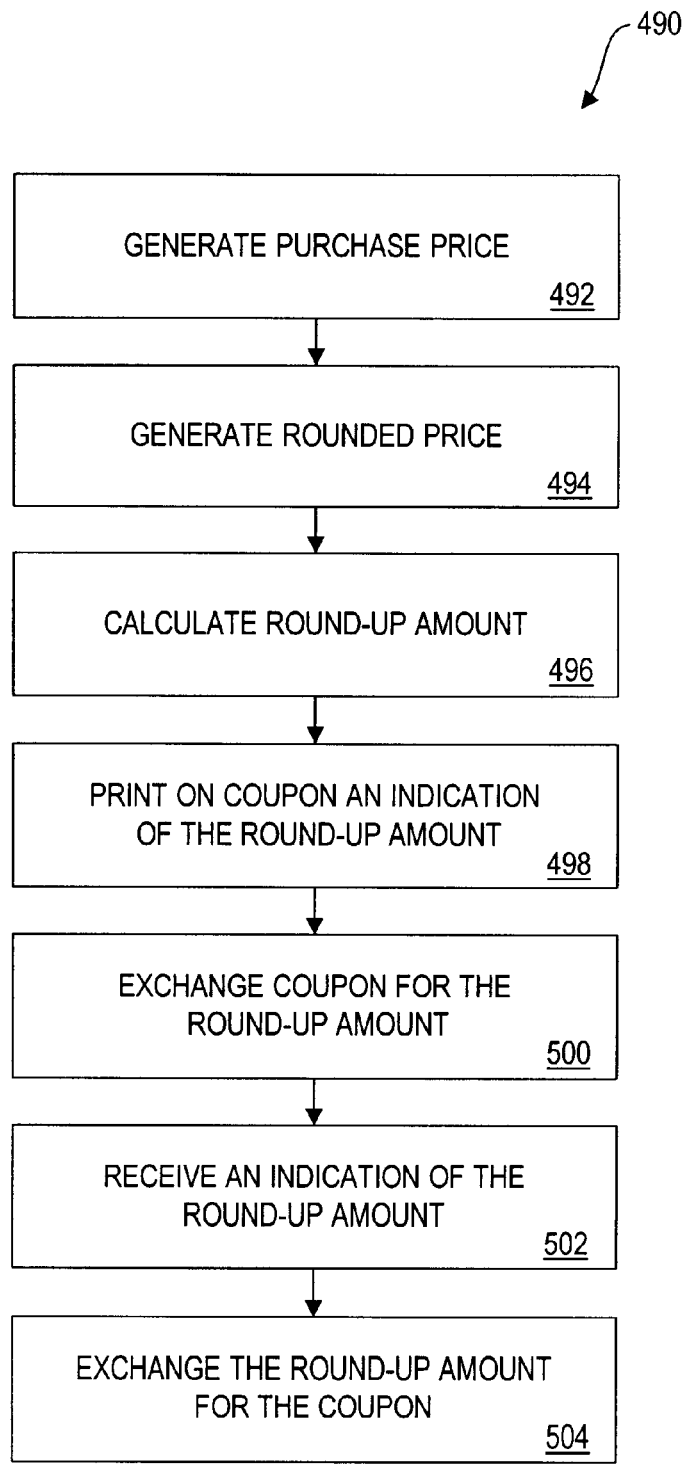
FIG. 20 is a flow chart illustrating another method for generating a coupon.

Referring to FIG. 20, a method 490 is performed by a POS terminal in generating a coupon. The POS terminal generates a purchase price and a rounded price (steps 492 and 494) and calculates a round-up amount therefrom (step 496). If the customer accepts the offer, the POS terminal prints on the coupon an indication of the round-up amount (step 498), and the coupon is exchanged for the round-up amount (step 500).

If the customer reconsiders, he can later return the coupon. The indication of the round-up amount that is printed on the coupon is received by the POS terminal (step 502). For example, the indication of the round-up amount may be encoded in the bar code, determinable from the bar code, or printed separately on the coupon. The bar code or other printing could be scanned by the POS terminal or entered via the input device 16. Once the POS terminal receives the indication and therefrom determines the round-up amount due to the customer, the round-up amount is exchanged for the coupon (step 504).

When the coupon is exchanged for the round-up amount, and vice-versa, the POS terminal may maintain an audit trail regarding the number of coupons that should have been received, and the amount of money that should have been received. Such an audit trail is useful in deterring and detecting fraud. Various auditing procedures will be understood by those skilled in the art.

It can be further desirable to encrypt the indication of the round-up amount to reduce the threat of counterfeit coupons. For example, if the indication of the round-up amount is merely text such as "$0.45", the coupon could be easily duplicated repeatedly. However, if the round-up amount is encrypted, counterfeiting becomes more difficult. Many encryption and decryption techniques are well known, and described in the text "Applied Cryptography, Protocols, Algorithms, and Source Code in C", Second Edition, by Bruce Schneier.

Also, if each coupon includes at least one unique identifier, thereby allowing redemption of each coupon to be tracked, then redemption of any counterfeit coupons may be more easily detected and reduced. In addition, if valid identifiers cannot be readily determined from other valid identifiers, fraud is further deterred.

When coupons are redeemed, it can be advantageous to store an indication of such redemption. If the coupon is redeemed, an indication of such redemption can be stored for later use. For example, based on historic redemption of particular coupons, different coupons may be offered.

Although the present invention has been described with respect to a preferred embodiment thereof, those skilled in the art will note that various substitutions may be made to those embodiments described herein without departing from the spirit and scope of the present invention. For example, many conditions may be used besides those conditions described in detail herein.

What is claimed is:

1. A method, comprising:

receiving, using a processor, a purchase price of a purchase;

determining, using the processor, a rounded price;

determining a round-up amount, the round-up amount being determined by the processor to be a difference between the purchase price and the rounded price; and causing a printer to print on a coupon an identifier that is based on the round-up amount.

2. An apparatus, comprising:

a storage device; and a processor in communication with the storage device, the storage device storing a program for controlling the processor; and the processor operative with the program to:
receive a purchase price of a purchase;
determine a rounded price;
determine a round-up amount, the round-up amount being a difference between the purchase price and the rounded price; and
cause to be printed on a coupon an identifier that is based on the round-up amount.

3. A medium encoded with a program for implementing a method, said program for directing a device to perform the steps of:

receiving a purchase price of a purchase;

determining a rounded price;

determining a round-up amount, the round-up amount being a difference between the purchase price and the rounded price; and causing to be printed on a coupon an identifier that is based on the round-up amount.

4. A method, comprising:

receiving, using a processor, a purchase price of a purchase;

determining, using the processor, a rounded price;

determining a round-up amount, the round-up amount being determined by the processor to be a difference between the purchase price and the rounded price;

setting, using the processor, a coupon value based on the round-up amount; and causing a printer to print on a coupon an identifier that is based on the coupon value.

5. The method of claim 4, wherein the step of setting a coupon value based on the round-up amount comprises:

setting, using the processor, a coupon value based on a predetermined multiple of the round-up amount.

6. An apparatus, comprising:

a storage device; and a processor in communication with the storage device, the storage device storing a program for controlling the processor; and the processor operative with the program to:
receive a purchase price of a purchase;
determine a rounded price;
determine a round-up amount, the round-up amount being a difference between the purchase price and the rounded price;
set a coupon value based on the round-up amount; and
cause to be printed on a coupon an identifier that is based on the coupon value.

7. The apparatus of claim 6, the processor further operative with the program to:

set a coupon value based on a predetermined multiple of the round-up amount.

8. A medium encoded with a program for implementing a method, said program for directing a device to perform the steps of:

receiving a purchase price of a purchase;

determining a rounded price;

determining a round-up amount, the round-up amount being a difference between the purchase price and the rounded price;

setting a coupon value based on the round-up amount; and causing to be printed on a coupon an identifier that is based on the coupon value.

9. The medium of claim 8, wherein the step of setting a coupon value based on the round-up amount comprises:

setting a coupon value based on a predetermined multiple of the round-up amount.

10. A method, comprising:

receiving, using a processor, a purchase price of a purchase;

determining, using the processor, a rounded price;

determining a round-up amount, the round-up amount being determined by the processor to be a difference between the purchase price and the rounded price;

determining, using the processor, whether the purchase includes redemption of a coupon; and if the purchase includes redemption of a coupon,
setting, using the processor, a coupon value based on the round-up amount, and
causing a printer to print on a coupon an identifier that is based on the coupon value.

11. An apparatus, comprising:

a storage device; and a processor in communication with the storage device, the storage device storing a program for controlling the processor; and the processor operative with the program to:
receive a purchase price of a purchase;
determine a rounded price;
determine a round-up amount, the round-up amount being a difference between the purchase price and the rounded price;
determine whether the purchase includes redemption of a coupon; and
if the purchase includes redemption of a coupon,
set a coupon value based on the round-up amount, and
cause to be printed on a coupon an identifier that is based on the coupon value.

12. A medium encoded with a program for implementing a method, said program for directing a device to perform the steps of:

receiving a purchase price of a purchase;

determining a rounded price;

determining a round-up amount, the round-up amount being a difference between the purchase price and the rounded price;

determining whether the purchase includes redemption of a coupon; and if the purchase includes redemption of a coupon,
setting a coupon value based on the round-up amount, and
causing to be printed on a coupon an identifier that is based on the coupon value.

* * * * *